Aug. 4, 1931.  C. CLAUS  1,817,891
SPRING SHACKLE
Filed Jan. 5, 1928
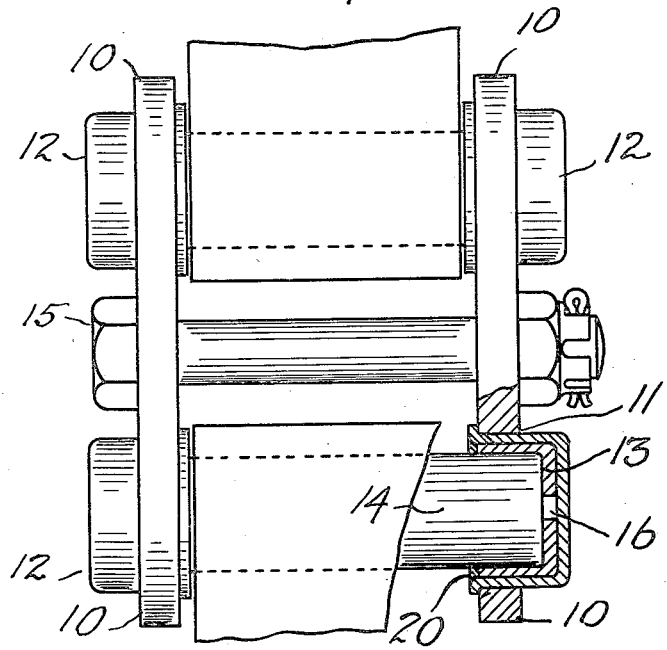
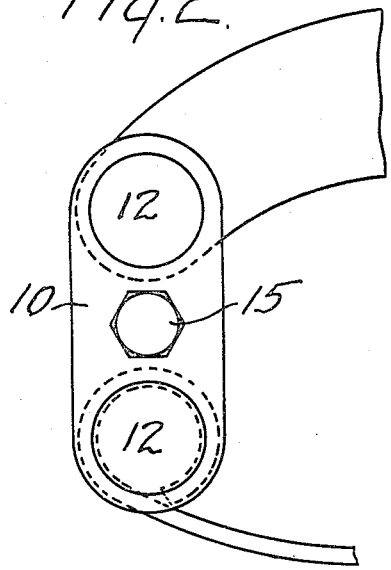
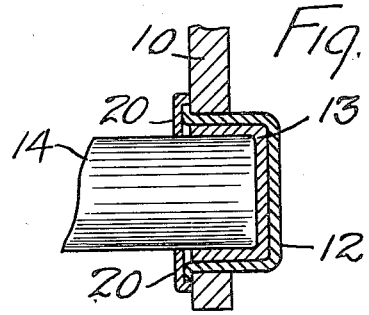
CARL CLAUS
INVENTOR
HIS ATTORNEY Patented Aug. 4, 1931

1,817,891

UNITED STATES PATENT OFFICE

CARL CLAUS, OF PLAINFIELD, NEW JERSEY, ASSIGNOR TO BOUND BROOK OIL-LESS BEARING COMPANY, OF BOUND BROOK, NEW JERSEY, A COMPANY OF NEW JERSEY

SPRING SHACKLE

Application filed January 5, 1928. Serial No. 244,722.

This invention relates to spring shackles particularly to that class of shackles which are used in automotive construction through which the spring is secured to the chassis of an automobile or other vehicles and has for its object to provide a shackle that will eliminate shackle care and annoyance common to those now in use and to provide uniform free shackle action which permits better and more uniform operation of the springs and, therefore, better riding qualities of the car.

Lubrication of spring eye and shackle bushings is very difficult due to high pressure and slight oscillation at the point of contact which has made it impossible to interpose and maintain a satisfactory oil film. Dust and water enter the bushing, mix with the lubricant, clog up the oil passages, absorb the lubricant and act in many cases as abrasives. This state of affairs produces rapid deterioration of the pins, bushings and shackle plates, also unsatisfactory action of the springs and shock absorbers, squeaks, rattles and jerks are the result.

Among the further objects of this invention is to provide means for maintaining over long periods a suitable oil film at the point of contact, thereby eliminating wear and the necessity of frequent lubrication, and to provide convenient and economic means for connecting vehicle springs to vehicles.

The foregoing and other features of my invention will now be described in connection with the accompanying drawing in which I have illustrated my spring shackle in its preferred form, after which I shall point out in the claims those features which I believe to be new and of my own invention.

I have illustrated a type of shackle in the accompanying drawing, in which:

Figure 1 is a front elevation of my improved spring shackle showing a portion of the same broken away to more clearly show its detailed construction.

Figure 2 is a side elevation of my improved spring shackle, shown connecting the chassis with one end of the spring.

Figure 3 is a modified detail which I employ.

Like characters of reference are used throughout the accompanying drawings and the following specification to designate corresponding parts.

My spring shackle is formed of two spaced side members or plates 10 which in the construction shown is provided on each end with a hole 11 in which is press-fitted a cup shaped socket 12. In these sockets 12 I provide a bushing of a porous material of the self-lubricating type 13. In these bushings 13 pins 14 bear. The assembly is held together by the bolt 15 which passes through openings in the intermediate portion of the side members 10.

The self-lubricating bushing 13 may be provided with a hole 16 as shown in Figure 1 or it may be made solid as shown in Figure 3. The sole purpose of this type of bushing is to substantially cover the flat end of the pins 14. It will be noted that these pins are of uniform diameter throughout their entire length and that the bushings 13 closely fit the entire end, thereby taking any lateral thrust in the spring shackle through the end of the pin and the bottom or flat surface of the bushing.

These bushings which have been mentioned as porous, will contain approximately 25% by volume of lubricant. Therefore, to prevent the lubricant from running away when the bushing is subjected to load and temperature, I provide a cover 20 which may either take the form of a simple ring as shown in Figure 1 or it may be an annular washer as shown in Figure 3 so long as it fills the space between the pins 14 and the edge of the cup shaped socket 12.

I distinctly wish it understood that my spring shackle herein illustrated and described is in the preferred form in which I desire to construct it but that changes or variations may be made as may be convenient or desirable without departing from the salient features of my invention and I, therefore, intend the following claims to cover such modifications as naturally fall within the lines of invention.

I claim:—

1. A spring shackle comprising spaced side members, said members being provided with through openings in their ends and an opening through the intermediate portion, cup shaped sockets provided with flanged rim, press fitted into the holes in the ends of the side members, cylindrical cross pins of uniform diameter throughout, self-lubricating bushings interposed between the ends of the pins and the sockets and having a flat end that contacts with the end of the pin and the bottom of the sockets.

2. The structure disclosed in claim 1 including means to prevent the lubricant from escaping from the porous bushing comprising an annular metal washer with angular cross section adapted to snugly fit the flanged rims of the sockets.

In witness whereof I affix my signature.

CARL CLAUS.